US008060153B2

(12) United States Patent
Jeong et al.

(10) Patent No.: US 8,060,153 B2
(45) Date of Patent: Nov. 15, 2011

(54) MEASUREMENT METHOD AND APPARATUS OF USER EQUIPMENT HAVING VARIABLE MEASUREMENT PERIOD IN A MOBILE COMMUNICATION SYSTEM

(75) Inventors: Kyeong-In Jeong, Hwaseong-si (KR); Soeng-Hun Kim, Suwon-si (KR); Gert Jan Van Lieshout, Staines (GB); Himke Van Der Velde, Staines (GB)

(73) Assignee: Samsung Electronics Co., Ltd (KR)

( * ) Notice: Subject to any disclaimer, the term of this patent is extended or adjusted under 35 U.S.C. 154(b) by 985 days.

(21) Appl. No.: 11/955,908

(22) Filed: Dec. 13, 2007

(65) Prior Publication Data

US 2008/0160918 A1    Jul. 3, 2008

(30) Foreign Application Priority Data

Dec. 13, 2006  (KR) .................... 10-2006-0127491

(51) Int. Cl.
*H04B 1/38* (2006.01)
*H04W 36/00* (2009.01)
*G08C 17/00* (2006.01)
(52) U.S. Cl. .................. 455/574; 455/436; 370/311
(58) Field of Classification Search .............. 455/574, 455/515, 436–443; 370/311
See application file for complete search history.

(56) References Cited

U.S. PATENT DOCUMENTS

| 6,377,803 | B1 | 4/2002 | Ruohonen |
| 6,400,953 | B1* | 6/2002 | Furukawa ................... 455/442 |
| 7,684,799 | B2* | 3/2010 | Kuchibhotla et al. ........ 455/436 |
| 2003/0117996 | A1 | 6/2003 | Lim et al. |
| 2003/0153370 | A1* | 8/2003 | Sako ............................ 455/574 |
| 2008/0101268 | A1* | 5/2008 | Sammour et al. ............ 370/311 |

FOREIGN PATENT DOCUMENTS

EP    1 499 144    1/2005

* cited by examiner

*Primary Examiner* — Jinsong Hu
*Assistant Examiner* — Marisol Figueroa
(74) *Attorney, Agent, or Firm* — The Farrell Law Firm, P.C.

(57) ABSTRACT

A method and apparatus for performing measurement by a User Equipment (UE) in a mobile communication system are provided. The UE has a Discontinuous Reception (DRX) mode for discontinuously receiving data and a continuous reception mode for continuously receiving data. The mobile communication system also has a serving cell where the UE is located, and a neighboring cell located near the serving cell. Signal strength of the serving cell is measured according to a period of the DRX mode. The signal strength measurement is continuously performed on the serving cell and the neighboring cell, if the measured signal strength of the serving cell is less than or equal to a particular threshold. The continuous signal strength measurement is stopped and signal strength of the serving cell is measured according to the period of the DRX mode, if the continuously measured signal strength of the serving cell is greater than the particular threshold.

11 Claims, 6 Drawing Sheets

MEASUREMENT METHOD AND APPARATUS OF USER EQUIPMENT HAVING VARIABLE MEASUREMENT PERIOD IN A MOBILE COMMUNICATION SYSTEM

PRIORITY

This application claims priority under 35 U.S.C. §119(a) to a Korean Patent Application filed in the Korean Intellectual Property Office on Dec. 13, 2006 and assigned Serial No. 2006-127491, the disclosure of which is incorporated herein by reference.

BACKGROUND OF THE INVENTION

1. Field of the Invention

The present invention relates generally to a mobile communication system, and more particularly, to a measurement method and apparatus of a User Equipment (UE) that has a Discontinuous Reception (DRX) cycle and is in a Radio Resource Control (RRC) connected mode.

2. Description of the Related Art

The Universal Mobile Telecommunication Service (UMTS) system is a $3^{rd}$ generation asynchronous mobile communication system that uses Wideband Code Division Multiple Access (W-CDMA) based on Global System for Mobile Communications (GSM) and General Packet Radio Services (GPRS), both of which are European mobile communication systems.

In $3^{rd}$ Generation Partnership Project (3GPP), which is in charge of UMTS standardization, discussions are being conducted regarding the Long Term Evolution (LTE) system as the next generation mobile communication system of the UMTS system. The LTE system is a technology for realizing high-speed packet-based communication having a maximum data rate of 100 Mbps, and aiming at commercialization in around 2010. Several communication schemes are under discussion for the LTE system. For example, a first scheme reduces the number of nodes located in the communication path by simplifying a configuration of the network, and a second scheme maximally approximates radio protocols to a radio channel.

FIG. 1 illustrates a configuration of an LTE system to which the present invention is applicable.

Referring to FIG. 1, an Evolved Radio Access Network (E-RAN) 110 is expected to be simplified to a 2-node configuration of Evolved Node Bs (ENBs) 120, 122, 124, 126 and 128, and anchor nodes 130 and 132. A User Equipment (UE or 'terminal') 101 can access an Internet Protocol (IP) network by means of the E-RAN 110, for communication.

The ENBs 120-128, corresponding to the existing Node Bs of the $3^{rd}$ generation system, can communicate with the UE 101 over the radio channel. The ENBs 120-128, compared to the existing Node Bs, will perform complex functions. This is due to the fact that in the LTE system, user traffic including real-time IP services such as Voice over IP (VoIP) will be serviced over a shared channel. Therefore, there is a need for an apparatus for collecting status information of multiple UEs and performing scheduling depending thereon, which is expected to be managed by the ENBs 120-128. Each ENB can control a plurality of cells.

The ENBs 120-128 perform Adaptive Modulation & Coding (AMC) that adaptively determines a modulation scheme and a channel-coding rate according to the channel status of the UE. In addition, the ENBs 120-128, together with the UE 101, will perform the Hybrid Automatic Repeat reQuest (HARQ) technique used in the services of the $3^{rd}$ generation system, such as High Speed Downlink Packet Access (HSDPA), High Speed Uplink Packet Access (HSUPA), and Enhanced Dedicated Channel (E-DCH). When various Quality of Service (QoS) requirements cannot be satisfied with only the HARQ technique, the ENBs 120-128 and the UE 101 will apply an Outer ARQ technique in their upper layers.

It is expected that the LTE system will use Orthogonal Frequency Division Multiplexing (OFDM) as a radio access technology in the 20-MHz bandwidth.

FIG. 2 illustrates a scheduling operation of a UE having a DRX interval, to which the present invention is applicable.

In the LTE system, operation modes of a UE can be classified into two modes: a Radio Resource Control (RRC) idle mode and an RRC connected mode. The RRC idle mode refers to the UE's status when there is no UE context information and service context information in the ENB. Further, the anchor node manages locations of the UEs using the UE context information, not in units of cells, but in units of tracking areas for paging. The RRC connected mode refers to the status when not only the anchor node but also the ENB have the UE context information, and the ENB can manage locations of the UEs, having an established RRC connection, in units of cells. The possibility that the service context information will also be included is not excluded herein.

In other words, an arbitrary UE in the RRC idle mode (hereinafter referred to as an 'RRC idle mode UE') first establishes an RRC connection to the ENB to receive or transmit the data for a particular service. In this case, the RRC idle mode UE should provide the UE context information to the ENB, and should establish a signaling connection even to the anchor node, It should also provide the UE context and service context information to the anchor node over the signaling connection. As a result, a UE in the RRC connected mode (hereinafter referred to as an 'RRC connected mode UE') can be immediately allocated corresponding radio resources from the ENB, and receive or transmit the data for a particular service using the allocated radio resources.

Referring to FIG. 2, the general RRC connected mode UE continuously receives a scheduling channel, and if the scheduling channel includes scheduling information for the UE itself, the RRC connected mode UE receives or transmits the data over the corresponding radio resources indicated by the scheduling channel. Herein, the UE determines whether UE identifier information (UE ID) included in the scheduling channel is identical to its allocated unique UE identifier information (unique UE ID), to check the presence of scheduling information for the UE itself.

In the LTE system, the RRC connected mode UE can perform a Discontinuous Reception/Transmission (DRX/DTX) operation to minimize its battery power consumption. That is, during the DRX interval (or cycle), the UE receives no scheduling channel associated with the data or control information. During the DRX interval, the UE disables (or turns OFF) its transmission and reception operations and operates in a sleep state.

Therefore, the RRC connected mode UE having the DRX interval discontinuously receives a scheduling channel and checks the presence/absence of scheduling information for the UE itself. For example, a UE having a DRX interval previously agreed upon between the ENB and the UE, enters the sleep state during the DRX interval to minimize the power consumption. After expiration of the DRX interval, the UE can transition to a wake-up state (or awake state) and receive a scheduling channel. The operation in which the UE discontinuously receives a scheduling channel using the DRX interval can include (i) an operation in which the DRX interval is determined according to a hard-coding scheme, (ii) an operation in which the DRX interval is determined according to a predefined rule such as a DRX interval calculation formula, and (iii) an operation in which the UE is allocated the DRX interval from the ENB by signaling.

Reference numerals 201, 202, 203 and 204 of FIG. 2 show the times at which the UE receives a scheduling channel from the ENB and checks the presence/absence of scheduling information for data reception/transmission.

If the UE has received a scheduling channel and the received scheduling channel includes no scheduling information for the UE itself, the UE transitions back to the sleep state for the DRX interval.

For example, the UE in the sleep state receives no channel transmitted over the downlink. In other words, the ENB does not perform scheduling for the UE during the DRX interval even though it has generated data for the UE to acquire scheduling synchronization with the UE.

If the ENB performs scheduling for the RRC connected mode UE having the DRX interval at time 204, the ENB, after the time 204, may stop the application of the DRX interval and operate in the RRC connected mode where DRX is disabled. That is, after the ENB has started the scheduling at the time 204, the ENB continuously schedules the UE without applying the DRX interval, and the UE can continuously receive a scheduling channel.

FIG. 3 illustrates a measurement operation of a UE having a DRX interval. The UE, as it performs measurement using the DRX interval, can minimize the power consumption.

The UE checks whether the scheduling for data reception/transmission has been performed at the time that it receives a scheduling channel, and at this time, the UE performs the measurement as well. Therefore, the UE performs no measurement for the DRX interval where it enters the sleep state, thereby reducing the power consumption, compared to when it continuously performs the measurement.

Referring to FIG. 3, the UE performs measurement on the current serving cell and neighboring cells at times 301, 302, 303, 304 and 305, and performs no measurement for the DRX interval.

After performing the measurement at time 301, the UE determines that there is no neighboring cell whose radio strength is greater than or equal to that of the current serving cell.

After performing the measurement at time 302, if the UE determines that there is a neighboring cell whose radio strength is greater than or equal to that of the serving cell, the UE starts (or activates) a counter or a timer for triggering measurement report. The measurement report is an operation in which the UE provides the ENB with information on a change in the radio environment. Based on the measurement report, the UE can perform handover. For example, upon detecting the presence of a neighboring cell having a greater radio strength than the current serving cell, the UE provides the ENB with information on a cell ID and radio strength of the neighboring cell. After checking the cell ID and the radio strength, the ENB determines whether to hand over the UE to the neighboring cell. The counter or the timer is used for preventing the frequent transmission of a measurement report due to the frequent change in the radio environment.

Generally, the measurement report for the changed radio environment cannot be transmitted by the UE to the ENB as long as a greater or equal radio strength is not continuously maintained during the count of the set counter or the time of the set timer. In other words, the UE transmits a measurement report to the ENB, when the state where the neighboring cell has radio strength greater than or equal to that of the serving cell is continuously maintained during the measurement count of the counter or the time of the timer. The measurement count or time is set immediately after the UE detects the presence of the neighboring cell whose radio strength is greater than or equal to that of the serving cell. For example, in FIG. 3, the counter is set to a value of 3. The counter value is subject to change. Therefore, upon detecting the neighboring cell having greater radio strength than that of the serving cell at time 302, the UE transmits a measurement report to the ENB in step 321 when the neighboring cell continuously has the greater radio strength than that of the serving cell during the set 3 measurement counts 311 of 303, 304 and 305.

As described in FIG. 3, the UE has a long delay time until it actually transmits the measurement report to the ENB. That is, the measurement report operation employing the counter or timer for preventing the frequent transmission of a measurement report, or for reducing the unnecessary signaling overhead, cannot actually transmit the measurement report at an appropriate time.

Therefore, the UE and the serving cell, which cannot perform the correct measurement report operation and cannot perform handover at an appropriate time, may bring a failure of the radio link between them. The radio link failure prevents normal transmission/reception not only of the control information necessary for data transmission/reception between the UE and the serving cell, but also of the actual data.

For example, assuming that a length of the DRX interval is 5.12 sec, the UE performs a measurement report operation having a long delay time of a total of 5.12 sec*3 intervals=15.36 sec, from the time 302 where the UE has determined that the neighboring cell has radio strength being greater than or equal to that of the current serving cell until the time 305 where the UE transmits the measurement report.

The reason the long delay time problem and the resulting problems occur is due to the fact that the UE's measurement operation performs the measurement only once every 5.12-sec DRX interval in the LTE system, as shown in FIG. 3. The UE cannot normally support the scenario where it should undergo handover for the DRX interval due to the change in the radio environment during the DRX interval.

SUMMARY OF THE INVENTION

The present invention has been made to address at least the above problems and/or disadvantages and to provide at least the advantages described below. Accordingly, an aspect of the present invention provides a method and apparatus for performing measurement report by a UE with minimized power consumption in a mobile communication system.

Another aspect of the present invention provides a method and apparatus for performing measurement report of a UE having a Discontinuous Reception (DRX) or Discontinuous Transmission (DTX) cycle in a mobile communication system.

According to one aspect of the present invention, a method for performing measurement by a User Equipment (UE) in a mobile communication system is provided. The UE has a Discontinuous Reception (DRX) mode for discontinuously receiving data and a continuous reception mode for continuously receiving data. The communication system also has a serving cell where the UE is located, and a neighboring cell located near the serving cell. Signal strength of the serving cell is measured according to a period of the DRX mode. The signal strength measurement is continuously performed on the serving cell and the neighboring cell, if the measured signal strength of the serving cell is less than or equal to a particular threshold. The continuous signal strength measurement is stopped and signal strength of the serving cell is measured according to the period of the DRX mode, if the continuously measured signal strength of the serving cell is greater than the particular threshold.

According to another aspect of the present invention, a method for performing measurement by a User Equipment (UE) in a mobile communication system is provided. The UE has a Discontinuous Reception (DRX) mode for discontinuously receiving data and a continuous reception mode for continuously receiving data. The communication system also has a serving cell where the UE is located, and a neighboring cell located near the serving cell. Signal strength of the serving cell is measured according to a period of the DRX mode. The signal strength measurement is continuously performed on the serving cell and the neighboring cell, if the measured signal strength of the serving cell is less than or equal to a particular threshold. A timer is started for transmitting a measurement result to the serving cell, if the continuously measured signal strength of the neighboring cell is greater than or equal to the continuously measured signal strength of the serving cell. The measurement result is transmitted to the serving cell, if the signal strength of the neighboring cell is not less than the signal strength of the serving cell until the timer expires.

According to a further aspect of the present invention, a method for performing measurement by a User Equipment (UE) in a mobile communication system is provided. The UE has a Discontinuous Reception (DRX) mode for discontinuously receiving data and a continuous reception mode for continuously receiving data. The mobile communication system also has a serving cell where the UE is located, and a neighboring cell located near the serving cell. Signal strengths of the serving cell and the neighboring cell are measured according to a period of the DRX mode. The signal strength measurement is continuously performed on the serving cell and the neighboring cell, if a difference between the measured signal strengths of the serving cell and the neighboring cell is less than or equal to a particular threshold. The continuous signal strength measurement is stopped and signal strength measurement is performed on the serving cell and the neighboring cell according to the period of the DRX mode, if the difference between the continuously measured signal strengths of the serving cell and the neighboring cell is greater than the particular threshold.

According to yet another aspect of the present invention, a User Equipment (UE) apparatus is provided for performing efficient measurement in a mobile communication system. The UE has a Discontinuous Reception (DRX) mode for discontinuously receiving data and a continuous reception mode for continuously receiving data. The mobile communication system also has a serving cell where the UE is located, and a neighboring cell located near the serving cell. The UE apparatus includes a transceiver for transmitting and receiving control information and data, and a DRX mode controller for controlling a period of the DRX mode. The UE apparatus also includes a measurement unit for measuring signal strength of the serving cell, and controlling a measurement period for the signal strength of the serving cell according to the measured signal strength of the serving cell.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF PREFERRED EMBODIMENTS

Figure 1:
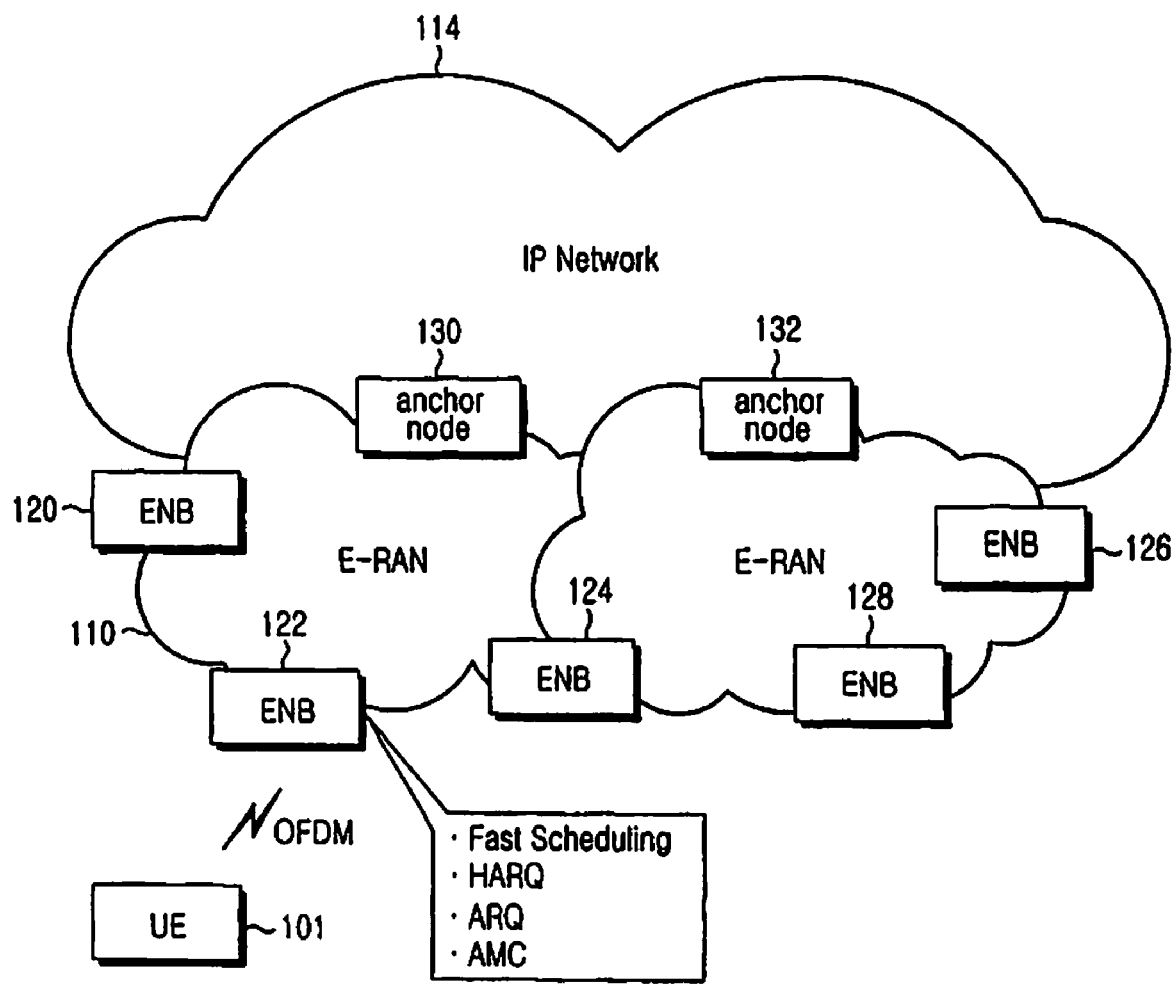
FIG. 1 illustrates a configuration of an LTE system to which the present invention is applicable.
Figure 2:
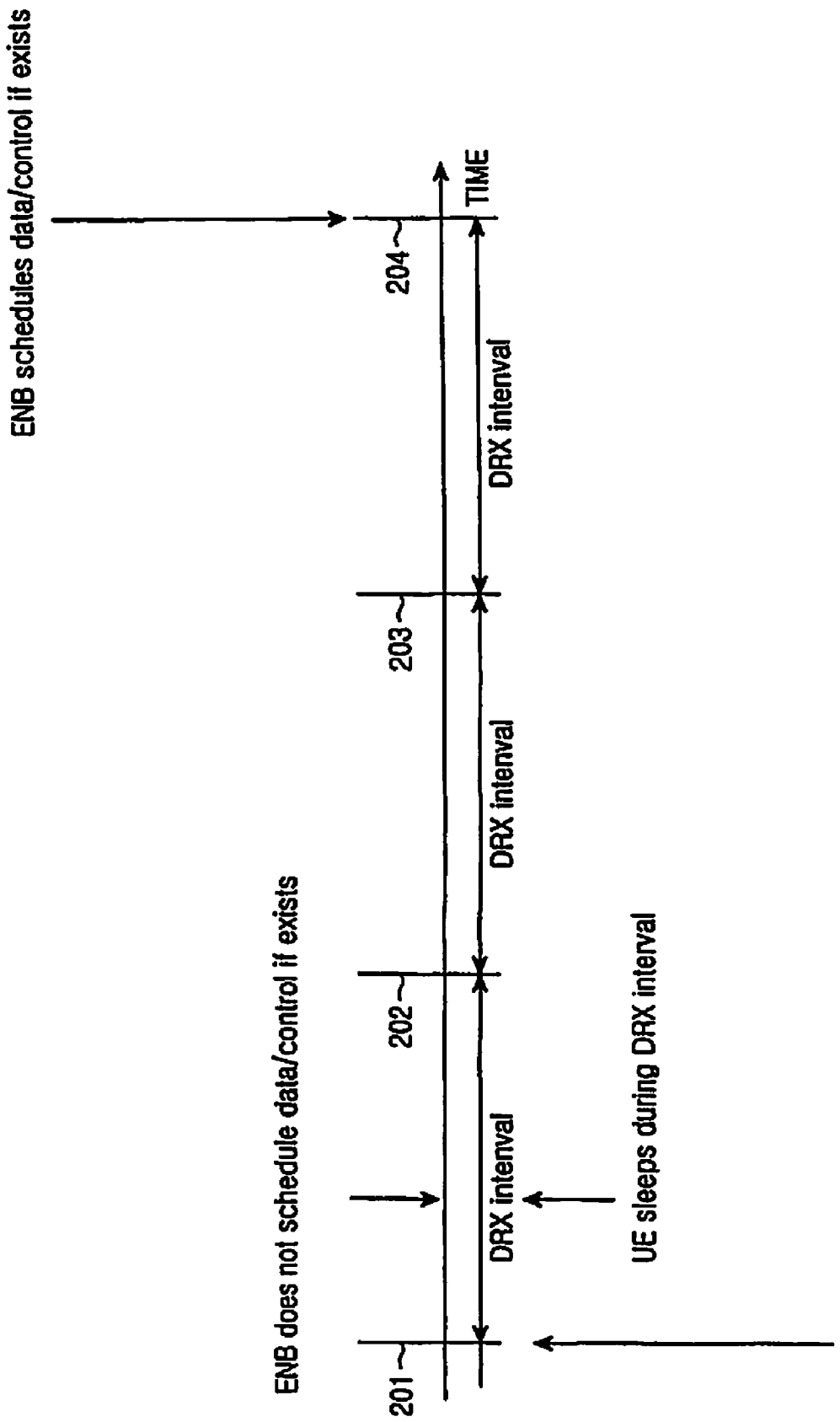
FIG. 2 illustrates a scheduling operation of a UE having a DRX interval, to which the present invention is applicable.
Figure 3:
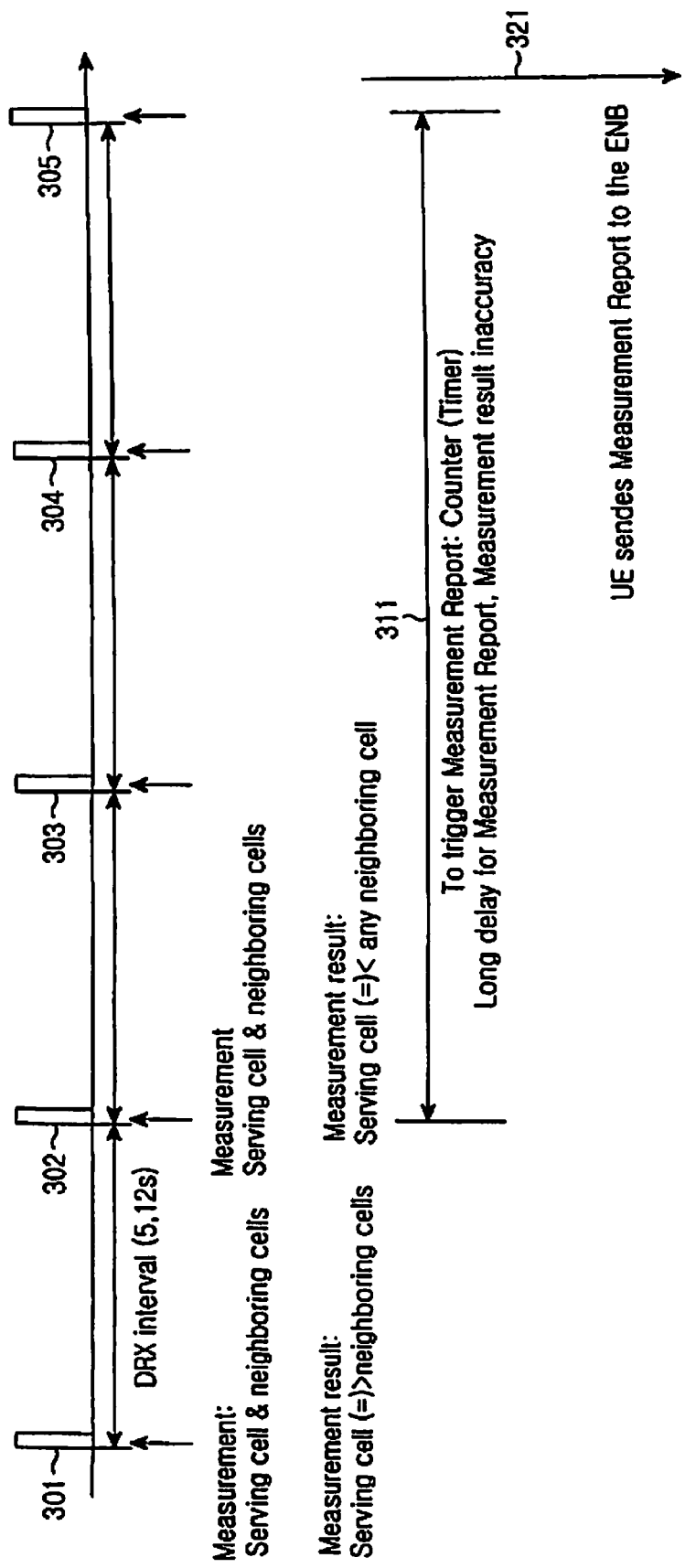
FIG. 3 illustrates a measurement operation of a UE having a DRX interval.

Preferred embodiments of the present invention are described in detail with reference to the accompanying drawings. Detailed descriptions of constructions or processes known in the art may be omitted to avoid obscuring the present invention.

Although the embodiments of the present invention will be described herein with reference to the LTE system evolved from the $3^{rd}$ generation system, by way of example, the embodiments of the present invention can be applied to all mobile communication systems to which ENB scheduling is applied, without modification.

The embodiments of the present invention define a measurement report of a UE in the LTE system, and in particular, define an operation of a UE that performs a DTX/DRX operation to minimize the power consumption and also performs measurement report. That is, the embodiments of the present invention provide a UE measurement report scheme for maximizing reliability of the measurement report and minimizing the power consumption.

In an embodiment of the present invention, the UE signals to the network a measurement result on the current serving cell using the same measurement period as the DRX interval, and performs measurement continuously or at time intervals shorter than the DRX interval, when the measurement result on the current serving cell is less than a particular threshold. If the measurement result satisfies a condition for transmitting a measurement report, the UE transmits the corresponding measurement report to the network.

The UE applies a counter or a timer to transmit a measurement report while performing the measurement continuously or at time intervals shorter than the DRX interval. If the measurement result on the current serving cell is continuously greater than the particular threshold, the UE applying the counter or the timer again performs the measurement using the same measurement period as the DRX interval. That is, the UE returns to the previous DRX interval measurement operation.

Although the present invention is described with reference to embodiments in which the UE compares the measurement result on the current serving cell with the particular threshold, the present invention can be applied to other embodiments where the UE compares a measurement result on the current serving cell with a measurement result on a candidate cell for handover.

In the embodiments of the present invention, the UE, which performs a DTX/DRX operation at a period of the DRX interval, performs a measurement operation in sync with the DRX intervals, and if the measurement result, i.e., the radio strength of the current serving cell, is greater than a particular threshold, the UE continuously performs the measurement at a period of the DRX interval. Herein, the UE can receive the threshold signaled from the ENB, or the threshold can be hard-coded as one fixed value.

However, if the radio strength of the serving cell is less than or equal to the particular threshold as a result of the measurement made in sync with the DRX intervals, the UE continuously performs the measurement while no longer performing the measurement in sync with the DRX intervals. If the radio strength of the serving cell is greater than or equal to the threshold in the course of performing the continuous measurement, the UE again performs the measurement in sync with the DRX intervals.

Upon detecting a neighboring cell having radio strength that is greater than or equal to that of the current serving cell while performing the continuous measurement, the UE starts the counter or the timer for triggering the measurement report. If the neighboring cell continuously maintains the radio strength that is greater than or equal to that of the current serving cell until the expiration of the counter or the timer, the UE transmits a measurement report to the ENB. However, if the radio strength of the current serving cell is greater than or equal to the particular threshold even before the expiration of the counter or the timer, the UE can again perform the measurement in sync with the DRX intervals.

The embodiments of the present invention can perform the measurement only for the serving cell when performing the measurement in sync with the DRX intervals, and can perform the measurement not only for the serving cell but also for the neighboring cells only when continuously performing the measurement out of sync with the DRX intervals. In addition, the embodiments of the present invention can frequently perform the measurement at shorter periods instead of continuously performing the measurement, when performing the measurement out of sync with the DRX intervals because the radio strength of the serving cell is less than or equal to the threshold. Further, the embodiments of the present invention include a scheme capable of comparing a radio strength difference between the serving cell and the neighboring cell with the threshold, instead of comparing the radio strength of the serving cell with the threshold.

Figure 4:
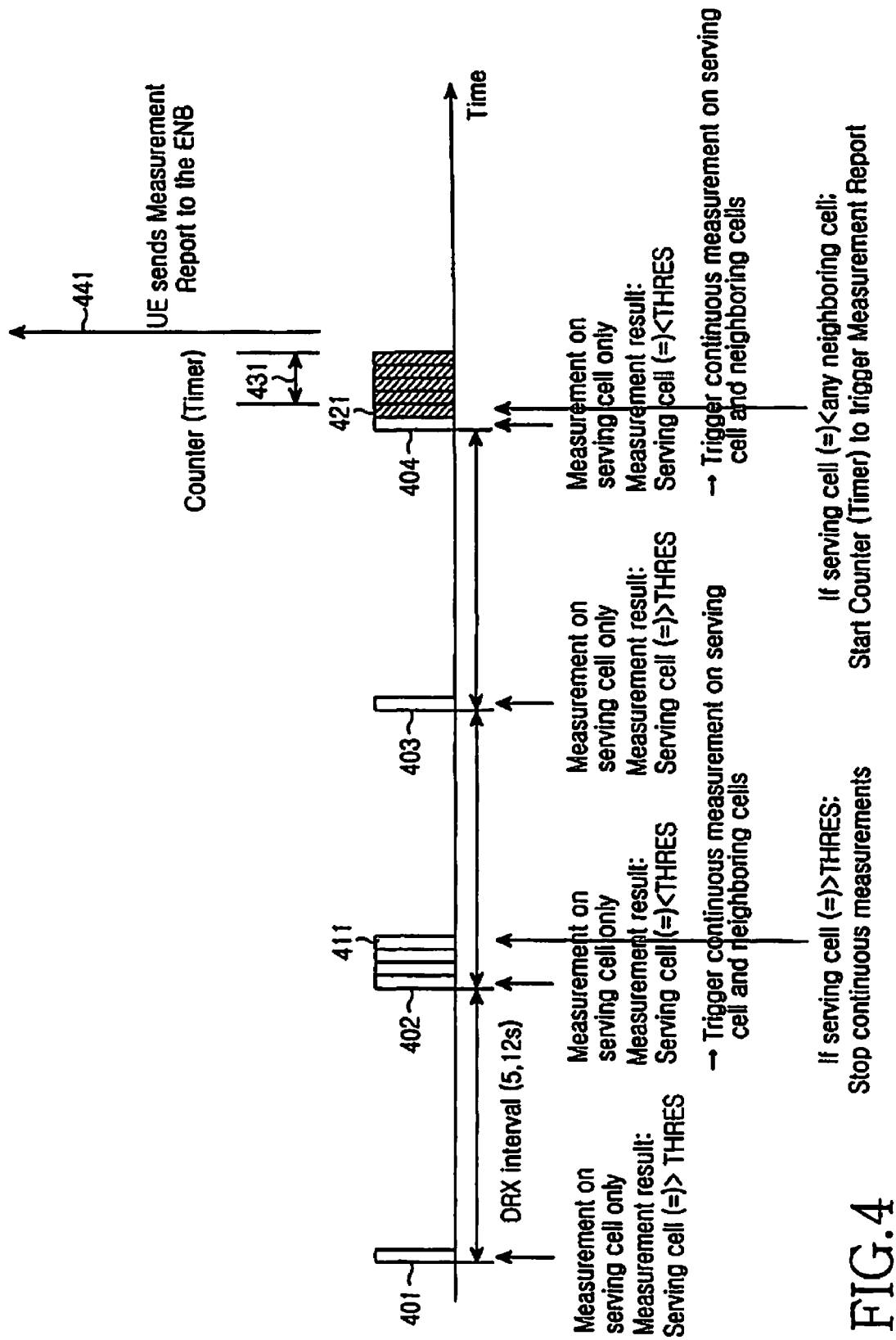
FIG. 4 illustrates a measurement operation of a LIE having a variable DRX interval according to an embodiment of the present invention.

FIG. 4 illustrates a measurement operation of a UE having a DRX interval proposed by an embodiment of the present invention.

Referring to FIG. 4, at time 401, the UE performs measurement on the serving cell in sync with the DRX interval. If the measurement result at time 401, i.e., the radio strength of the serving cell, is greater (or higher) than or equal to a predetermined particular threshold THRES, the UE performs measurement on the serving cell at time 402 where it receives the next scheduling channel after expiration of the DRX interval. That is, the UE does not perform the measurement for the DRX interval. Herein, the UE can receive the particular threshold THRES signaled through common signaling such as the system information dedicated-signaled or broadcasted from the ENB. Alternatively, the particular threshold THRES can be hard-coded as one fixed value.

If the measurement result at time 402, i.e., the radio strength of the serving cell, is less (or lower) than or equal to the particular threshold, the UE continuously performs measurement on the serving cell and neighboring cells, or performs the measurement on the serving cell and the neighboring cells frequently, i.e., using the period of a time interval being shorter than the period of the DRX interval. If the UE frequently performs the measurement on the serving cell and the neighboring cells using the period of the shorter time interval, the UE receives the shorter time interval information signaled from the ENB through dedicated signaling or common signaling. The common signaling means an operation of receiving broadcasted system information. Alternatively, the shorter time interval information can be hard-coded as a fixed value.

While the UE performs the measurement on the serving cell and the neighboring cells from time 402 continuously or using a period of a shorter time interval, if the radio strength of the serving cell is greater than or equal to the threshold at time 411, the UE stops the measurement that it was continuously performing or was frequently perform using the period of the shorter time interval. Further, the UE does not perform the measurement for the DRX interval, and performs the measurement only on the serving cell at time 403. That is, if the serving cell has a good channel status, the UE performs measurement at a period of the DRX interval, i.e., at a period of the DRX interval where it wakes up to receive a scheduling channel.

If the measurement result at time 403, i.e., the radio strength of the serving cell, is greater than or equal to the particular threshold, the UE performs measurement only on the serving cell at time 404 where it wakes up to receive the next scheduling channel, without performing the measurement for the DRX interval. If the measurement result at time 404, i.e., the radio strength of the serving cell, is less than or equal to the threshold, the UE performs measurement on the serving cell and the neighboring cell continuously, or frequently using the period of the shorter time interval. Upon detecting the neighboring cell having radio strength being greater than or equal to that of the serving cell at time 421 while performing the measurement at a period of the shorter time interval, the UE starts the counter or the timer for determining transmission of the measurement report.

If the neighboring cell continuously maintains the radio strength being greater than or equal to that of the serving cell during the measurement count of the counter or the time of the timer, which is set at time 431, the UE transmits a measurement report to the ENB at time 441. The measurement report transmitted at time 441 can include status information for the radio environment of the UE, cell ID information of the neighboring cell, and radio strength, which is the measurement result. The transmission of the measurement report by the UE at time 441 can be defined to transmit the measurement report when the measurement result made for N or more counts among the M counts performed during the set counter or timer maintains the radio environment at time 421, i.e., when the neighboring cell maintains the radio strength being greater than or equal to that of the serving cell.

In the case where the UE cannot transmit the measurement report unless it continuously maintains the radio environment during the set counts M of the counter or the set time T of the timer, if the radio strength of the neighboring cell is less than or equal to that of the serving cell for the interval 431, the UE cancels (or disables) the counter or the timer.

If the measurement result on the serving cell for the time interval 431 is greater than or equal to the particular threshold THRES, the UE stops the measurement on the serving cell and the neighboring cell that it was continuously performing or was frequently perform using the period of the shorter time interval, and does not perform the measurement during the DRX interval to which the interval 431 belongs. The UE can perform measurement only on the serving cell at the time that it wakes up to receive the next scheduling channel.

The counter or the timer for the interval 431 can be set in different ways by the ENB. For example, the ENB sets the counter or the timer depending on whether the radio strength of the neighboring cell enters or leaves the scope of Alpha ($\geqq 0$) against the radio strength of the serving cell, or whether the radio strength of the neighboring cell enters or leaves the scope of Alpha ($\geq 0$) against the particular absolute radio strength, and then signals the setting result to the UE. The set scope can be transmitted through common signaling such as system information dedicated-signaled or broadcasted by the ENB. Therefore, the UE starts the counter or the timer for the interval 431 if the radio environment at time 421 is coincident with the signaled setting result.

Figure 5:
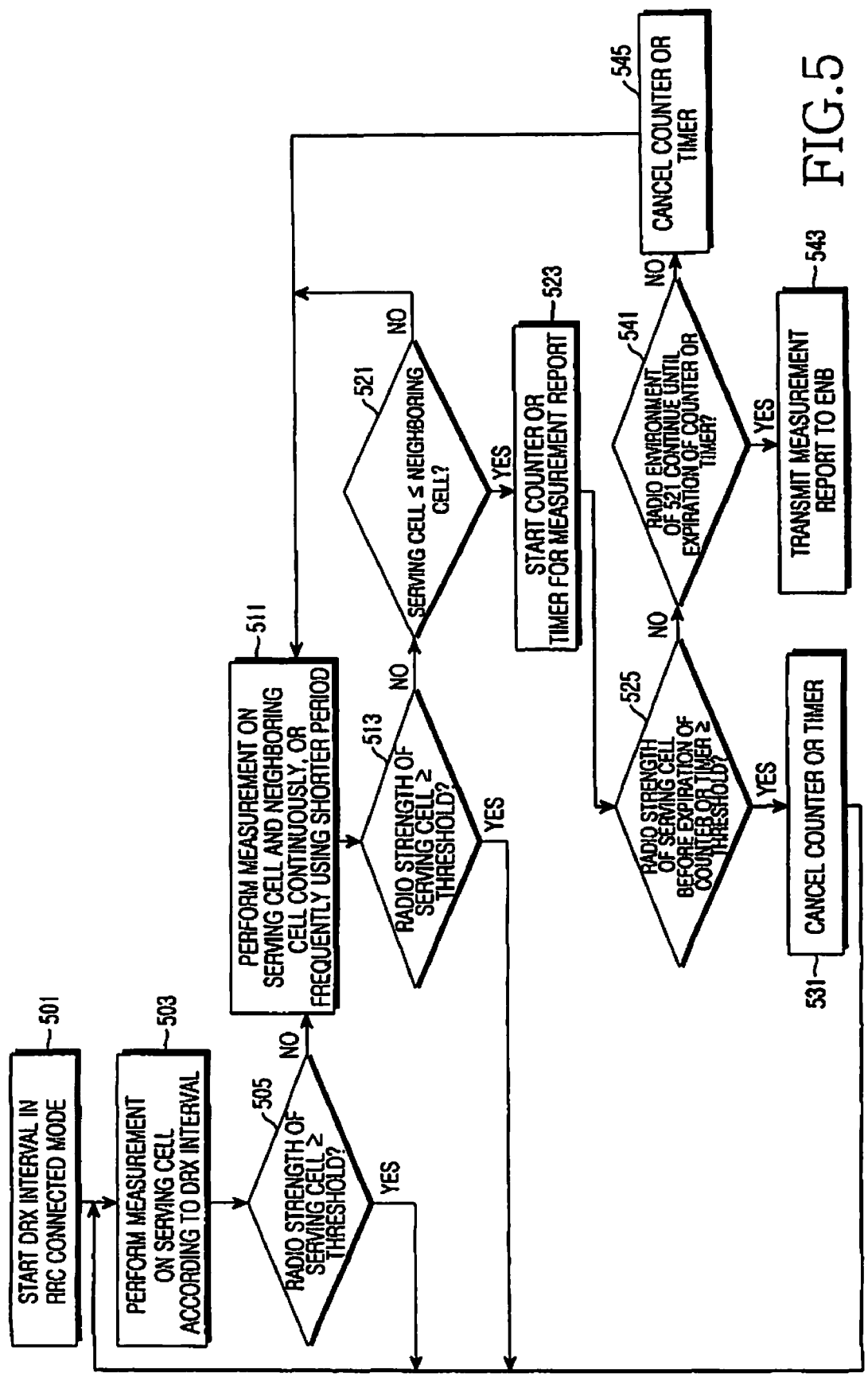
FIG. 5 illustrates a measurement operation of a UE according to an embodiment of the present invention.

FIG. 5 illustrates a measurement operation of a UE according to an embodiment of the present invention.

Referring to FIG. 5, in step 501, the UE, which is in the RRC connected mode, performs a DTX/DRX operation at a period of the DRX interval. In step 503, the UE perform measurement on the serving cell at a period of the DRX interval. That is, the UE performs the measurement on the serving cell at the time where it wakes up to receive a scheduling channel. This means that the UE does not perform the measurement for the DRX interval. Therefore, the UE has high efficiency in terms of the power consumption as it has no need to continuously receive the scheduling channel.

In step 505, the UE checks whether the measurement result in step 503, i.e., the radio strength of the serving cell, is greater than or equal to a particular threshold THRES. Herein, the particular threshold is a value that the UE has received through common signaling such as the system information dedicated-signaled or broadcasted from the ENB. Alternatively, the particular threshold is a fixed value obtained by hard-coding one value.

If the determined value of the measurement result in step 505 is YES, the UE proceeds to step 503 where it performs measurement on the serving cell according to a period of the DRX interval. However, if the determined value of the measurement result in step 505 is NO, the UE proceeds to step 511 where it performs the measurement on the serving cell and the neighboring cells continuously, or using a period of a time interval being shorter than the DRX interval period.

If the radio strength of the serving cell is greater than or equal to the particular threshold in step 513 while the UE performs the measurement in step 511, the UE stops the measurement on the serving cell and the neighboring cells that it was continuously performing or was performing using the period of the shorter time interval, and then proceeds to step 503. That is, if the radio strength of the serving cell increases, the UE performs the measurement only on the serving cell at a period of the DRX interval.

However, if the radio strength of the serving cell is still not greater than or equal to the particular threshold, the methodology continues to step 521. If the radio strength of the neighboring cell is greater than or equal to the radio strength of the serving cell in step 521 while the UE performs step 511, the UE proceeds to step 523 where it starts a counter or a timer for transmission of a measurement report. The UE can receive a value for the counter or the timer, signaled through common signaling such as the system information dedicated-signaled or broadcasted from the ENB.

If it is determined from the measurement result in step 525 that the radio strength of the serving cell is greater than or equal to the threshold THRES before expiration of the counter or the timer, the UE proceeds to step 531 where it cancels the counter or the timer. Thereafter, the UE proceeds to step 503 where it performs the measurement on the serving cell at a period of the DRX interval. In addition, if the condition of step 521 does not occur while the UE performs step 511, the UE proceeds to step 511 where it performs the measurement on the serving cell and the neighboring cells continuously, or frequently using the period of the shorter time interval.

However, if the measurement result in step 521, i.e., the state where the radio strength of the neighboring cell is greater than or equal to the radio strength of the serving cell, is continuously maintained until the counter or the timer, which was started in step 523, expires in step 541, then the UE proceeds to step 543 where it transmits a measurement report to the ENB. The measurement report can include an identifier for the radio environment, an identifier of the neighboring cell, and a measurement result value.

In the case where the radio environment in step 521 changes, for example, the radio strength of the serving cell is greater than or equal to that of the neighboring cell before the expiration of the counter or the timer in step 541, if the radio strength of another neighboring cell other than the neighboring cell is greater than or equal to that of the serving cell and the neighboring cell in step 521, the UE proceeds to step 545 where it cancels the counter or the timer in operation. Thereafter, the UE proceeds to step 511 where it performs the measurement on the serving cell and the neighboring cells continuously, or frequently using the period of the shorter time interval.

Figure 6:
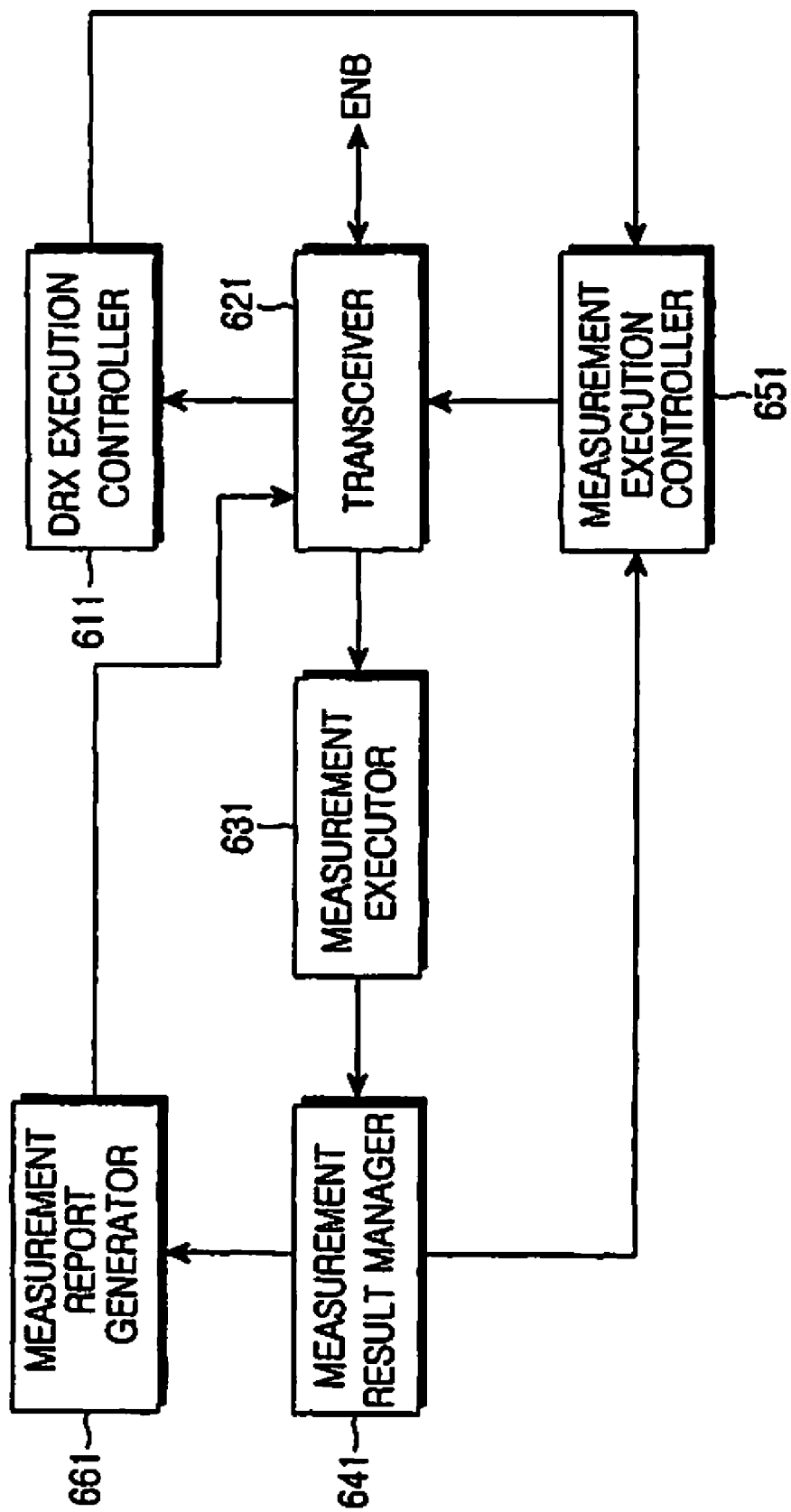
FIG. 6 illustrates a block diagram of a UE apparatus according to an embodiment of the present invention.

FIG. 6 illustrates a block diagram of a UE apparatus according to an embodiment of the present invention.

Referring to FIG. 6, a controller 611 controls the timing where the UE receives a scheduling channel. That is, the controller 611 indicates a DRX execution controller for controlling the UE to perform a DRX/DTX operation using a period of the DRX interval.

The controller 611 controls a transceiver 621 such that the UE operates in the sleep state, i.e., disables the transceiver 621, during the DRX interval, and transitions to the awake state, i.e., enables the transceiver 621, at the scheduling time where the DRX interval has expired.

The transceiver 621, under the control of the controller 611, receives a scheduling channel at the scheduling time, and checks whether there is any radio resource allocated from the ENB. The transceiver 621 exchanges control information or data with the ENB at the scheduling time.

According to the present invention, the controller 611 controls the transceiver 621 using an input parameter of a measurement execution controller 651. That is, the controller 611 controls the measurement execution controller 651 such that it does not perform the measurement for the DRX interval according to the DRX operation, and performs the measurement only on the serving cell at the scheduling time for receiving the scheduling channel.

For reference, although the present invention assumes the DRX interval as 5.12 sec, it is not intended to limit the length of the DRX interval to 5.12 sec. That is, embodiments of the present invention can use the longer interval or the shorter interval taking into consideration the efficiency of the radio channel environment and the system performance. In other words, the length of the DRX interval can be variably set according to the system environment.

The measurement execution controller 651 controls the transceiver 621 to receive a pilot channel for measurement at the scheduling time. A measurement executor 631, under the control of the measurement execution controller 651, performs measurement on a pilot channel of the serving cell, or pilot channels of the serving cell and the neighboring cell.

A measurement result manager 641 manages and stores the measurement result of the measurement executor 631. For example, the measurement result manager 641 manages and stores the parameters such as the particular threshold THRES for determining the radio strength of the serving cell, and the counter or the timer being set for the measurement report. Therefore, the measurement result manager 641 detects a change in the radio environment using the parameters. Herein, the particular threshold is a value that the UE has received through common signaling such as the system information dedicated-signaled or broadcasted from the ENB. Alternatively, the particular threshold is a fixed value obtained by hard-coding one value. Similarly, the UE can receive the value for the counter or the timer, signaled through common signaling such as the system information dedicated-signaled or broadcasted from the ENB. Herein, the value for the counter or the timer can be set in different ways according to the capacity of the ENB.

A measurement report generator 661 generates a measurement report message, if there is a need to transmit a measurement report to the ENB due to an important change in the radio environment in the measurement result manager 641. The measurement report message is transmitted to the ENB by means of the transceiver 621.

If it is determined from the measurement result of the measurement result manager 641 that the radio strength of the serving cell is less than or equal to the threshold, the measurement execution controller 651, regarding the measurement result as a control input parameter, controls the measurement period not only for the serving cell but also for the neighboring cells so that it may continuously perform the measurement out of sync with the DRX interval, or frequently perform the measurement using the period of the shorter time interval. That is, the measurement execution controller 651 controls the transceiver 621 to continuously receive a pilot channel at the scheduling time, or controls the transceiver 621 to receive a pilot signal at a period of the time interval being shorter than the period of the DRX interval.

Accordingly, the measurement executor 631 measures a pilot channel of the serving cell or the neighboring cell, which is received continuously or at a shorter time period, and the measurement result manager 641 checks and manages the measurement result of the measurement executor 631. According to the measurement result, the measurement report generator 661 generates a measurement report message.

As is apparent from the foregoing description, embodiments of the present invention allow the UE supporting the DTX/DRX operation to make the measurement report with the minimum power consumption. That is, embodiments of the present invention provide the minimum power consumption for the measurement report of the UE.

In addition, embodiments of the present invention perform the measurement operation using a variable measurement period rather than the predetermined measurement period, making it possible to take into consideration the real-time varying channel environment on a real-time basis. Further, embodiments of the present invention minimize the transmission delay for the measurement report of the UE, thereby facilitating the fast report to the ENB on the channel environment of the UE. Therefore, embodiments of the present invention appropriately perform the measurement report, thereby maintaining the normalized radio link to the ENB.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing measurement by a User Equipment (UE) in a mobile communication system including the UE having a Discontinuous Reception (DRX) mode for discontinuously receiving data and a continuous reception mode for continuously receiving data, a serving cell where the UE is located, and a neighboring cell located near the serving cell, the method comprising:
   measuring signal strength of the serving cell according to a period of the DRX mode;
   continuously performing the signal strength measurement on the serving cell and the neighboring cell, when the measured signal strength of the serving cell is less than or equal to a particular threshold;
   starting a timer for transmitting a measurement result to the serving cell, when the measured signal strength of the neighboring cell is greater than or equal to the measured signal strength of the serving cell; and
   transmitting the measurement report to the serving cell, when the signal strength of the neighboring cell is greater than or equal to the signal strength of the serving cell until the timer expires.

2. The method of claim 1, wherein the continuously performing the signal strength measurement comprises:
   measuring the signal strength at a period that is shorter than the period of the DRX mode.

3. The method of claim 1, wherein the measurement result comprises the measured signal strength, and identifier (ID) information of the neighboring cell.

4. The method of claim 1, wherein the timer comprises a counter.

5. A method for performing measurement by a User Equipment (UE) in a mobile communication system including the UE having a Discontinuous Reception (DRX) mode for discontinuously receiving data and a continuous reception mode for continuously receiving data, a serving cell where the UE is located, and a neighboring cell located near the serving cell, the method comprising:
   measuring signal strengths of the serving cell and the neighboring cell according to a period of the DRX mode;
   continuously performing the signal strength measurement on the serving cell and the neighboring cell, when a difference between the measured signal strengths of the serving cell and the neighboring cell is less than or equal to a particular threshold; and
   stopping the continuous signal strength measurement and measuring signal strength of the serving cell and the neighboring cell according to the period of the DRX mode, when the difference between the continuously measured signal strengths of the serving cell and the neighboring cell is greater than the particular threshold.

6. The method of claim 5, wherein the continuously performing the signal strength measurement comprises:
   measuring the signal strength at a period that is shorter than the period of the DRX mode.

7. A User Equipment (UE) apparatus for performing efficient measurement in a mobile communication system including a UE having a Discontinuous Reception (DRX) mode for discontinuously receiving data and a continuous reception mode for continuously receiving data, a serving cell where the UE is located, and a neighboring cell located near the serving cell, the apparatus comprising:
   a transceiver for transmitting and receiving control information and data;
   a DRX mode controller for controlling a period of the DRX mode; and
   a measurement unit for measuring signal strength of the serving cell, and controlling a measurement period for the signal strength of the serving cell according to the measured signal strength of the serving cell,
   wherein the measurement unit:

continuously performs the signal strength measurement on the serving cell and the neighboring cell, when the measured signal strength of the serving cell is less than or equal to a particular threshold;

starts a timer for transmitting a measurement result to the serving cell, when the continuously measured signal strength of the neighboring cell is greater than or equal to the continuously measured signal strength of the serving cell; and transmits the measurement result to the serving cell by means of the transceiver, when the signal strength of the neighboring cell is greater than or equal to the signal strength of the serving cell until the timer expires.

8. The UE apparatus of claim 7, wherein the measurement unit:

stops the continuous signal strength measurement and performs signal strength measurement on the serving cell according to the period of the DRX mode, when the continuously measured signal strength of the serving cell is greater than the particular threshold.

9. The UE apparatus of claim 7, wherein the measurement result comprises the measured signal strength, and identifier (ID) information of the neighboring cell.

10. The UE apparatus of claim 7, wherein the timer comprises a counter.

11. The UE apparatus of claim 7, wherein the measurement unit comprises:

a measurement executor for receiving a pilot channel and performing measurement thereon;

a measurement result manager for managing a measurement result of the measurement executor, and detecting a change in a radio environment using a threshold for determining signal strength; and a measurement execution controller for controlling a period of the measurement according to the detection result of the measurement result manager.

* * * * *